United States Patent
Cho et al.

(10) Patent No.: US 9,544,933 B2
(45) Date of Patent: Jan. 10, 2017

(54) METHOD AND APPARATUS FOR DISCOVERING DEVICE BASED ON LOCATION INFORMATION

(71) Applicant: Samsung Electronics Co., Ltd., Gyeonggi-do (KR)

(72) Inventors: Chihong Cho, Gyeonggi-do (KR); Junhyung Kim, Gyeonggi-do (KR); Sangho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 64 days.

(21) Appl. No.: 14/598,924

(22) Filed: Jan. 16, 2015

(65) Prior Publication Data
US 2015/0208454 A1 Jul. 23, 2015

(30) Foreign Application Priority Data
Jan. 23, 2014 (KR) .................. 10-2014-0008103

(51) Int. Cl.
*H04W 76/02* (2009.01)
*H04W 8/00* (2009.01)

(52) U.S. Cl.
CPC .......... *H04W 76/023* (2013.01); *H04W 8/005* (2013.01)

(58) Field of Classification Search
None
See application file for complete search history.

(56) References Cited

U.S. PATENT DOCUMENTS

| | | | |
|---|---|---|---|
| 2012/0113971 A1 | 5/2012 | Giaretta et al. | |
| 2013/0281146 A1* | 10/2013 | Walton | H04W 48/16 455/515 |
| 2013/0332297 A1* | 12/2013 | Forutanpour | G01C 21/3461 705/26.1 |
| 2014/0241331 A1* | 8/2014 | Ma | H04W 4/008 370/338 |
| 2014/0351444 A1* | 11/2014 | Qi | H04L 67/16 709/227 |

* cited by examiner

*Primary Examiner* — Anh Ngoc Nguyen
(74) *Attorney, Agent, or Firm* — The Farrell Law Firm, P.C.

(57) ABSTRACT

A Wireless Fidelity (Wi-Fi) Direct connection method for a User Equipment (UE) is provided. The method includes receiving a probe signal from at least one device; comparing location information in the probe signal with location information of the UE; and performing the Wi-Fi Direct connection for the at least one device transmitting the probe signal including location information that is the same as that of the UE. In addition, a method of supporting a Wi-Fi Direct connection for a wireless Access Point (AP) is provided. The method includes receiving common location information from at least one gateway; and transmitting unique identification information of the wireless AP and the common location information to at least one Wi-Fi Direct support device, wherein the unique identification information and the common location information are used to create location information, which is included in a probe signal, in the Wi-Fi Direct support device.

18 Claims, 6 Drawing Sheets

METHOD AND APPARATUS FOR DISCOVERING DEVICE BASED ON LOCATION INFORMATION

PRIORITY

This application claims priority under 35 U.S.C. §119(a) to a Korean Patent Application filed on Jan. 23, 2014 in the Korean Intellectual Property Office and assigned Serial No. 10-2014-0008103, the entire contents of which are incorporated herein by reference.

BACKGROUND

1. Field of the Invention

The present invention relates generally to a method and apparatus for discovering a device based on location information, and more particularly, to a method and apparatus for discovering a device based on location information in Wireless Fidelity (Wi-Fi) Peer to Peer (P2P) communication.

2. Description of the Related Art

In recent years, with development of wireless technology, wired networks have been replaced by wireless networks. That is, since mobility problems with wired networks were able to be solved using wireless technology, studies on a variety of technologies using wireless networks have been increasingly conducted. Thanks to the remarkable development of information and communication technologies and semiconductor technologies, the supply and use of various portable terminals has rapidly increased. In particular, portable terminals have reached a mobile convergence stage of encompassing areas of other types of user equipment without being confined to their traditional unique areas. Mobile communication terminals provide various additional functions, such as a TV viewing function (e.g., mobile broadcasting such as Digital Multimedia Broadcasting (DMB) or Digital Video Broadcasting (DVB)), a music reproduction function (e.g., Moving Picture Experts Group (MPEG) Audio Layer-3 (MP3) player), a photography function, and a Wi-Fi access function, in addition to a typical communication function, such as a voice call or message transmission/reception.

A significance of a Wireless Local Area Network (WLAN), which is also referred to as Wireless Fidelity (Wi-Fi), is that wireless networks are easy to use, and the Internet can be used via portable terminals or notebooks within a predetermined distance from wherever an Access Point is installed. Particularly, the wireless LAN, which has potential as an open wireless network, is being rapidly proliferated with the popularization of portable terminals, and Wi-Fi is used to provide high-speed data services to entire cities including schools, airports, hotels, and offices.

Typical wireless communication using Wi-Fi is only aimed at Internet connection via an access point and lacks consideration for direct communication between devices providing Wi-Fi functions. Accordingly, functions referred to as Wi-Fi P2P or Wi-Fi Direct are being developed to provide direct communication functions between devices. Although direct communication functions between devices are similar to those provided by such technologies as Bluetooth, Wi-Fi P2P is more advantageous due to its transmission range and data transmission rate as compared to Bluetooth, and therefore, Wi-Fi P2P communication is becoming more important.

SUMMARY

The present invention has been made to address the above-mentioned problems and disadvantages, and to provide at least the advantages described below. Accordingly, an aspect of the present invention provides a method and apparatus for discovering a device based on location information. In addition, another aspect of the present invention provides a method and apparatus for efficiently discovering a device based on location information in Wi-Fi Peer to Peer (P2P) communication.

Furthermore, another aspect of the present invention is to provide a method and apparatus which can easily and simply discover another device and protect privacy in the process of connecting Wi-Fi devices.

In accordance with an aspect of the present invention, a Wi-Fi Direct connection method for a User Equipment (UE) is provided. The method includes receiving a probe signal from at least one device; comparing location information in the probe signal with location information of the UE; and performing the Wi-Fi Direct connection for the at least one device transmitting the probe signal including location information that is the same as that of the UE.

In accordance with another aspect of the present invention, a UE for supporting a Wi-Fi Direct connection is provided. The UE includes a communication unit configured to perform data communication with an Access Point (AP) and at least one device; and a controller configured to receive a probe signal from the at least one device, compare location information included in the probe signal with location information of the UE, and perform the Wi-Fi Direct connection for the at least one device transmitting the probe signal including location information that is the same as that of the user equipment.

In accordance with another aspect of the present invention, a method of supporting a Wi-Fi Direct connection for a wireless Access Point (AP) is provided. The method includes receiving common location information from at least one gateway; and transmitting unique identification information of the wireless AP and the common location information to at least one Wi-Fi Direct support device, wherein the unique identification information and the common location information are used to create location information, which is in a probe signal, in the at least one Wi-Fi Direct support device.

In accordance with another aspect of the present invention, a wireless Access Point (AP) for supporting a Wi-Fi Direct connection is provided. The wireless AP includes a communication unit configured to perform data communication with a network node therearound; and a controller configured to receive common location information from at least one gateway and transmit unique identification information of the wireless AP and the common location information to at least one Wi-Fi Direct support device, wherein the unique identification information and the common location information are used to create location information, which is in a probe signal, in the at least one Wi-Fi Direct support device.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
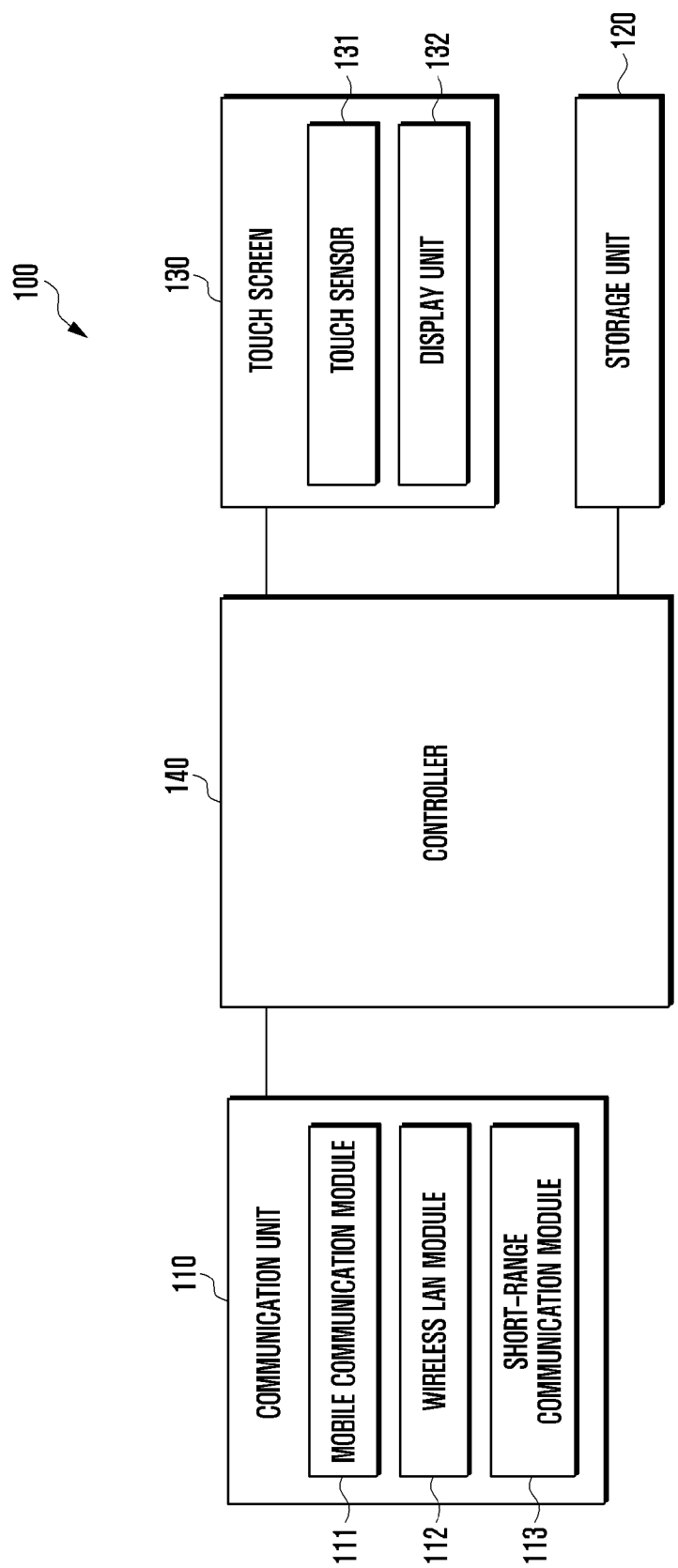
FIG. 1 is a block diagram of a portable terminal according to an embodiment of the present invention.

Hereinafter, various embodiments of the present invention will be described with reference to the accompanying drawings. It should be noted that the same elements will be designated by the same reference numerals although they are shown in different drawings. Further, a detailed description of a known function and configuration which may make the subject matter of the present invention unclear is omitted. Hereinafter, it should be noted that only the descriptions will be provided that may facilitate understanding of the operations provided in association with the various embodiments of the present invention, and other descriptions are omitted to avoid making the subject matter of the present invention unclear.

Wi-Fi used in embodiments of the present invention is data technology for transmitting/receiving wireless data using a wireless LAN which allows a terminal to access the wireless Internet. An Access Point (AP) is implemented only by a wireless Internet router installed at a location, and Wi-Fi technology allows for wireless communication to be used within a radius of 10 to 20 meters. A typical Wi-Fi network has an AP functioning as a central hub, and devices can indirectly communicate with each other via the AP, instead of direct access between Wi-Fi communication devices.

In contrast, Wi-Fi Direct applied to the embodiments of the present invention, which is technology that allows direct access to another device in a wireless manner and transmits/receives data without any AP, is mainly used to transfer data between smart devices supporting Wi-Fi Direct. When the devices supporting Wi-Fi Direct are first connected to each other, the devices may determine which piece of equipment will act as an AP. Wi-Fi Direct has a larger data transmission radius and higher transmission speed than Bluetooth. Therefore, Wi-Fi Direct may be used in various forms, such as wireless printers, smart TVs, and competition games. In the embodiments of the present invention, Wi-Fi Direct may be used together with Wi-Fi Peer to Peer (P2P).

A terminal according to embodiments of the present invention may include all devices using an Application Processor (AP), a Graphics Processing unit (GPU), and a Central Processing Unit (CPU), such as all information and communication devices, all multimedia devices, and all application devices thereof, which support functions of the present invention. For example, a portable terminal may include a smart phone, a Personal Digital Assistant (PDA), a tablet Personal Computer (PC), and Portable Multimedia Player (PMP) which have wireless LAN functions and short-range communication functions loaded therein.

FIG. 1 is a block diagram of a portable terminal 100 according to an embodiment of the present invention.

Referring to FIG. 1, the portable terminal 100 according to the present invention includes a wireless communication unit 110, a storage unit 120, a touch screen 130, and a controller 140.

The wireless communication unit 110 includes one or more modules enabling wireless communication between the portable terminal 100 and a wireless communication system or between the portable terminal 100 and a user device. For example, the wireless communication unit 110 includes a mobile communication module 111, a Wireless Local Area Network (WLAN) module 112, and a short-range communication module 113.

The mobile communication module 111 transmits/receives a wireless signal to/from at least one of a base station, an external mobile station, and various servers (e.g., an integration server, a provider server, a content server, an Internet server, and a cloud server) on a mobile communication network. Examples of the wireless signal include a voice call signal, a video call signal, or various forms of data according to transmission and reception of text/multimedia messages.

The wireless LAN module 112 represents a module for establishing wireless Internet access and a wireless LAN link with a user device, and may be embedded in or on the exterior of the electronic device. Examples of wireless Internet technology include Wireless Fidelity (Wi-Fi), Wireless Broadband (WiBro), World interoperability for microwave access (Wimax), and High Speed Downlink Packet Access (HSDPA). In addition, the wireless LAN module 112 transmits or receives various types of data (e.g., images, videos, and music) according to a user's selection to/from the user device when the wireless LAN link is established with the user device. The wireless LAN module 112 may be maintained in a turned-on status or may be turned on according to a user's configuration or input.

In the present invention, the wireless LAN module 112 may perform Wi-Fi Direct connection between portable terminals. The Wi-Fi Direct is technology which provides direct connection between terminals with no Access Point (AP).

The short-range communication module 113 represents a module for short-range communication. Examples of short-range communication technology include Bluetooth, Bluetooth Low Energy (BLE), Radio Frequency IDentification (RFID), Infrared Data Association (IrDA), Ultra Wideband (UWB), ZigBee, and Near Field Communication (NFC). Furthermore, the short-range communication module 113 transmits or receives various types of data (e.g., images, videos, and music) according to a user's selection to/from a user device when short-range communication is connected with the user device. The short-range communication module 113 may be maintained in a turned-on status or turned on according to a user's configuration or input.

The storage unit 120 stores programs and data required for operations of the portable terminal 100 and may be divided into a program area and a data area. The program area stores a program for controlling an overall operation of the portable terminal 100, an Operating System (OS) for booting the portable terminal 100, and application programs. The data area, which is an area for storing data generated according to use of the portable terminal 100, may store images and videos.

The touch screen 130 is an input/output unit for simultaneously performing an input function and a display function and includes a touch sensor 131 and a display unit 132. In an embodiment of the present invention, the touch screen 130 displays, via the display unit 132, screens (e.g., a short-range communication execution screen, a wireless LAN connection configuration screen, and a gallery screen) according to operations of the portable terminal 100. When a user's touch event is input via the touch sensor 131 while a screen is being displayed via the display unit 132, the touch screen 130 transfers an input signal according to the touch event to the controller 140. Then, the controller 140 distinguishes the touch event and controls an operation according to the touch event.

The touch sensor 131 senses a user's touch event (e.g., a tap, a drag, a sweep, a flick, and a multi-touch) contacting the surface of the touch screen 130. When the touch sensor 131 senses the user's touch event on the surface of the touch screen 130, the touch sensor 131 detects coordinates where the touch input is generated and transmits the detected coordinates to the controller 140. The controller 140 performs a function corresponding to an area where the touch event is generated, by the signal transmitted from the touch sensor 131.

The display unit 132 displays various screens according to use of the portable terminal 100. For example, the display unit 132 visually provides input data and various pieces of information to a user. The display unit 132 may be configured with a Liquid Crystal Display (LCD) or an Organic Light Emitting Diode (OLED).

In an embodiment of the present invention, the touch screen 130 including the touch sensor 131 and the display unit 132 is merely an example, and the present invention is not necessarily limited thereto. That is, the touch sensor 131 and the display unit 132 may be separately provided without being included in the touch screen 130.

The controller 140 controls an overall operation of the portable terminal 100 and signal flow between internal components (e.g. the wireless communication unit 110, the storage unit 120, and the touch screen 130) of the portable terminal 100, performs a function of processing data, and controls power supplied from a battery to the components.

In an embodiment of the present invention, the controller 140 receives a probe signal from the at least one device, compares location information included in the probe signal with location information of the portable terminal 100, and performs Wi-Fi Direct connection for a device transmitting a probe signal including the same location information as that of the portable terminal 100.

In this case, the location information may be created based on a Service Set Identifier (SSID) of each Access Point (AP) to which the terminal or the device is connected. In addition, the location information may further include common IDentification (ID) information when a plurality of APs is connected to the same GateWay (GW). The location information may be transmitted while being included in a Peer to Peer (P2P) information element of a probe signal.

The controller 140 excludes, in device discovery, a device transmitting a probe signal including different location information from that of the portable terminal 100. The controller 140 receives an SSID from the AP, creates the location information based on the SSID, and stores the created location information. The controller 140 creates a probe signal using the location information.

Although the components of the portable terminal 100 have been separately described for convenience of description, the present invention should not be construed as being limited thereto. In addition, the portable terminal 100 may perform operations of Wi-Fi Direct devices in FIGS. 2 to 5 as well as the contents described with reference to FIG. 1.

Hereinafter, operations of a Wi-Fi Direct support device according to an embodiment of the present invention is described. A device discovery operation is described first.

The device discovery process, which is a function of Wi-Fi P2P (or Wi-Fi Direct), is required for Wi-Fi Direct devices to recognize and connect to each other. A Wi-Fi Direct support device which enters a menu for using a Wi-Fi Direct function or a device discovery mode when an application is executed discovers Wi-Fi Direct support devices therearound, by periodically repeating channel scan, listen, and search of Institute Of Electrical and Electronics Engineers (IEEE) Standard 802.11 (hereinafter "IEEE 802.11") for a predetermined period of time.

A device discovery procedure in Wi-Fi Direct is performed by exchanging a probe request message and a probe response message of IEEE 802.11 MAC protocol. The probe request message include P2P Information Element (IE), Wi-Fi Simple Configuration (WSC) IE, and Supplemental Registration (Supp Reg) IE, and the probe response message may include P2P IE, WSC IE, Remote Service Node (RSN) IE, and Supp Reg IE.

Next, a service discovery operation is described. The service discovery operation may be selectively performed between the aforementioned discovery process and the group creation process which is described below. The service discovery process is performed to provide a function of exchanging information on services which each P2P device can provide, by identifying a service protocol and a service which the P2P device providing a Wi-Fi Direct function can support via exchanging a request message and a response message.

For example, in a case where a first P2P device is a camera and a second P2P device is a printer, when a user using the first P2P device wants to output a photo, the first P2P device must determine whether the second P2P device supports the function of outputting a photo. Therefore, via service discovery, it is determined whether the second P2P device can output a photo.

Assume that file sharing between the first P2P device and the second P2P device 2 is requested via creation of a Wi-Fi P2P group. For example, when the first P2P device uses a file sharing method based on Universal Plug and Play (UPnP) and the second P2P device uses a file sharing method based on Web Service (WS), the file sharing between the two devices will not be performed, and therefore, a service discovery process must be performed.

Next, a group creation operation is described.

P2P devices (e.g., the first P2P device and the second P2P device) performs provision discovery to create a Wi-Fi P2P group in Wi-Fi P2P. The provision discovery is one of many features defined in the specification of Wi-Fi Direct (Wi-Fi P2P). In order to use the Wi-Fi P2P function, the P2P devices basically operate based on Wi-Fi Simple Configuration (WSC) (for example, operate based on Wi-Fi Protected Setup (WPS)). Although optional in the existing Wi-Fi standards, WSC support of a connection device corresponds to a mandatory attribute in Wi-Fi Direct.

The WSC is a function provided for more convenient wireless connection and is classified into a Push Button Configuration (PBC) method in which a button is pressed and a Personal Identification Number (PIN) method in which a PIN number is input. In both the PBC method and the PIN method, configuration must be completed within 120 seconds. The PBC method is described as an example. When an input is entered via a WPS button in a counterpart device within 120 seconds after one device requests wireless connection via the PBC method, WSC registration protocol is initiated, and the devices exchange Service Set Identifiers (SSID) and credentials (including information, such as authentication type, encryption type, network key, and SSID, as the sum of cryptographic information) which are required for connection.

In the provision discovery method, which is a standard newly defined in Wi-Fi Direct, in order to address problems with the conventional WSC, when a Wi-Fi P2P device (e.g., the first P2P device) discovers another Wi-Fi P2P device (e.g., the second P2P device) and then attempts connection via the conventional WSC (e.g., PBC method or PIN method), a user using the other Wi-Fi P2P device is informed of the connection attempt by transmitting a WSC Configuration Method message.

The WSC Configuration Method message includes PBC, PIN from Display, and PIN from Keypad. PBC may receive a button input from the user using the other Wi-Fi P2P device, and PIN from Display and PIN from Keypad may display a PIN number on the other Wi-Fi P2P device or inform the user using the other Wi-Fi P2P device of a P2P connection attempt by an event for receiving an input of a PIN number.

When the users using the first P2P device and the second P2P device accommodates the Wi-Fi P2P connection so that the provision discovery is completed, a Group Owner Negotiation process is performed between the Wi-Fi P2P devices. Since Wi-Fi P2P requires determination (or configuration) of a Group Owner (GO) to play a key role of a Wi-Fi P2P group created, the Group Owner Negotiation process of determining a Wi-Fi P2P device serving as a Group Owner is required so as to use the function of Wi-Fi P2P.

The Group Owner Negotiation process is performed by exchange of GO Negotiation Request, GO Negotiation Response, and GO Negotiation Confirm frames, and the GO Negotiation Request and the GO Negotiation Response include P2P IE information and WSC IE information. A P2P IE field includes information such as P2P Capability, P2P Device Information, Group Owner Intent, Configuration Timeout, Listen Channel, Extended Listen Timing, Intended P2P Interface Address, Channel List, and Operating Channel attributes, and a WSC-IE field includes information such as a device password ID, a manufacturer, a model name, a model number, a serial number, and a device name.

The first P2P device and the second P2P device compare intent values (e.g. Group Owner Intent) included in P2P IE. The device having a greater intent value is determined as a Group Owner (GO), and the device having a lesser intent value is determined as a Group Client (GC). When the first P2P device and the second P2P device are determined as the GO and the GC, respectively, the Group Owner Negotiation process is completed. The device configured as the Group Owner operates as a WSC registrar and the device configured as the Group Client operates as a WSC Enrollee. As a result, when Provisioning for exchanging credentials is completed, the group configuration process for forming a Wi-Fi P2P group is completed.

In addition, attributes of the P2P group are also determined in the Group Owner Negotiation process and include a temporary group and a persistent group. The temporary group corresponds to a case of using the formed P2P group only once, and the persistent group corresponds to a case of continuously using the formed P2P group.

When the created P2P group is configured as a persistent group, P2P devices in the corresponding P2P group store credentials and information on roles (e.g., Group Owner or Group Client) of the P2P devices in the P2P group. When a request for forming a P2P group is subsequently made, the processes such as Provision Discovery, Group Owner Negotiation, and Provisioning can be omitted, thereby rapidly forming a P2P group and thus, enhancing connection speed. For example, when a discovered device belongs to a P2P group previously formed as a fixed group, a device corresponding to a Group Owner may create a P2P group via an exchange of information (e.g., invitation request/response) including attributes of the P2P group, and a device corresponding to a Group Client may rapidly access the P2P group using the credential stored therein.

Thereafter, when the group creation process is completed, the device corresponding to the Group Owner moves to an operating channel to start to serve as the Group Owner, and the device corresponding to the Group Client accesses the Group Owner using the credential identified via Provisioning. Therefore, the two P2P devices are finally connected to the Wi-Fi P2P group.

Figure 2:
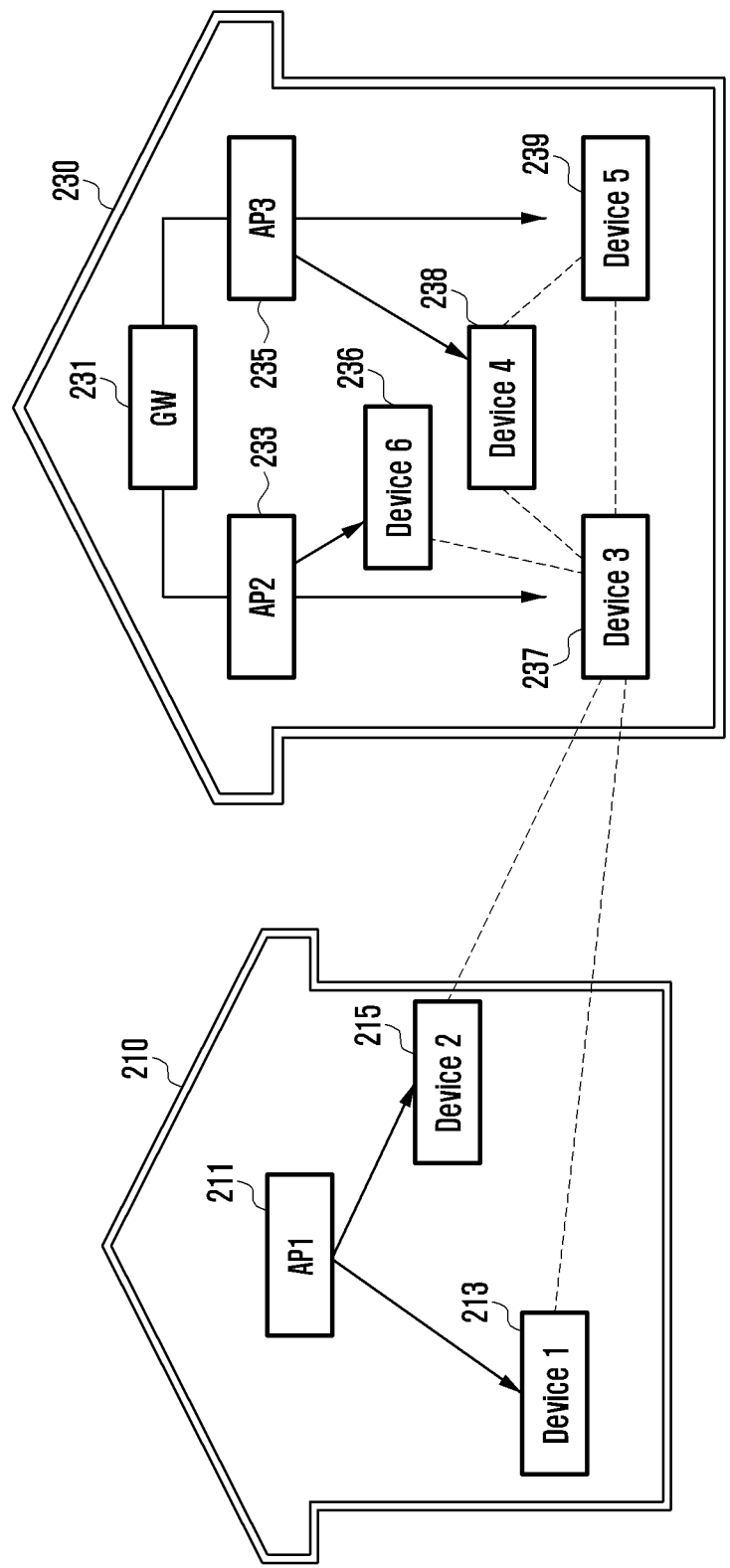
FIG. 2 illustrates a Wi-Fi Direct support system according to an embodiment of the present invention.

FIG. 2 illustrates a Wi-Fi Direct support system according to an embodiment of the present invention.

Referring to FIG. 2, the Wi-Fi Direct support system according to an embodiment of the present invention includes preconfigured regions 210 and 230, a GateWay (GW) 231, wireless Access Points (APs) 211, 233, and 235, and Wi-Fi Direct support devices one through six 213, 215, 236, 237, 238, and 239. Houses are illustrated as an example of the preconfigured regions 210 and 230. Although houses are illustrated as an example of the preconfigured regions 210 and 230 in the following description, an embodiment of the present invention is not limited thereto. That is, a space using the same GW or AP may be configured as one distinguished region. In FIG. 2, a solid line represents a connection between the gateway 231 and each AP 211, 233, and 235 or between the AP 211, 233, and 235 and the corresponding Wi-Fi Direct support device 213, 215, 236, 237, 238, and 239, and a dotted line represents a connection between the Wi-Fi Direct devices 213, 215, 236, 237, 238, and 239. In the following description, a device refers to a Wi-Fi Direct device 213, 215, 236, 237, 238, and 239. In addition, each AP 211, 233, and 235 is assumed to support Wi-Fi communication.

The first AP 211 is included in the first region 210. The first AP 211 is connected to the first device 213 and the second device 215 via Wi-Fi, and the first device 213 and the second device 215 may perform Wi-Fi communication while being connected to the first AP 211. In addition, the first device 213 and the second device 215 may perform Wi-Fi Direct communication.

The gateway 231 is included in the second region 230. The gateway 231 is connected to the second AP 233 and the third AP 235. The second AP 233 and the third AP 235 are connected to the same gateway 231 and thus, may share common location information (a location ID, for example, unique information on the gateway 231). The third to fifth devices 237, 238, and 239 located in the second region 230 may perform Wi-Fi communication while being connected to the second AP 233 or the third AP 235. In addition, each of the third to sixth devices 236, 237, 238, and 239 may perform Wi-Fi Direct communication.

Assume that the first region 210 and the second region 230 correspond to different houses, respectively, and the third device 237 desires to communicate with another device via Wi-Fi Direct communication. In this case, although the first to third devices 213, 215, and 237 are located in different regions, the first devices 213 and the second device 215 in the first region 210 may be discovered in the process of discovering a device to be connected when making connection between the Wi-Fi devices, even if the third device 237 desires to connect to the devices in the second region 230. This causes inconvenience for the third device 237 in that an unnecessary device is discovered. For example, when a number of devices are discovered, the number of items in a search list is increased and a significant amount of time and electrical power is consumed. Furthermore, since the devices 213 and 215 located in the first region 210 are discovered by the device located in the second region 230, a problem involving a privacy breach may be encountered. Moreover, the devices connected to the different APs 233 and 235 in the second region 230 must be configured to discover each other in performing a Wi-Fi Direct connection operation, since the devices are present in the second region 230 although connected to different APs.

Provided in an embodiment of the present invention are a device discovering method and a device connection method for preventing devices beyond the range of a user-configured region from being discovered when a user connects his/her device to another device via Wi-Fi Direct in the configured region (e.g., in the user's house). In an embodiment of the present invention, only devices having the same location information may be discovered and connected to each other, by identifying the user-configured region based on location information, followed by excluding devices without the same location information. The location information may be created based on attributes of APs located in the user-configured region. In addition, the attributes of the APs may include SSID information. Furthermore, when two or more APs are used in one configured region, as in the case of the second region 230, devices connected to the different APs may also be discovered by sharing the locations of the APs via the gateway 231. Common information provided by the gateway 231 may be created based on an attribute of the gateway 231 and may include the SSID information of the gateway.

An SSID is a unique identifier attached to each packet header transmitted via a wireless LAN. As text data used when wireless devices access a Basic Service Set (BSS), an SSID distinguishes one wireless LAN from other wireless LANs. Therefore, all APs or wireless devices accessing a wireless LAN must use a predetermined SSID. If the SSID is changed, the APs or wireless devices cannot access the corresponding BSS.

Figure 3:
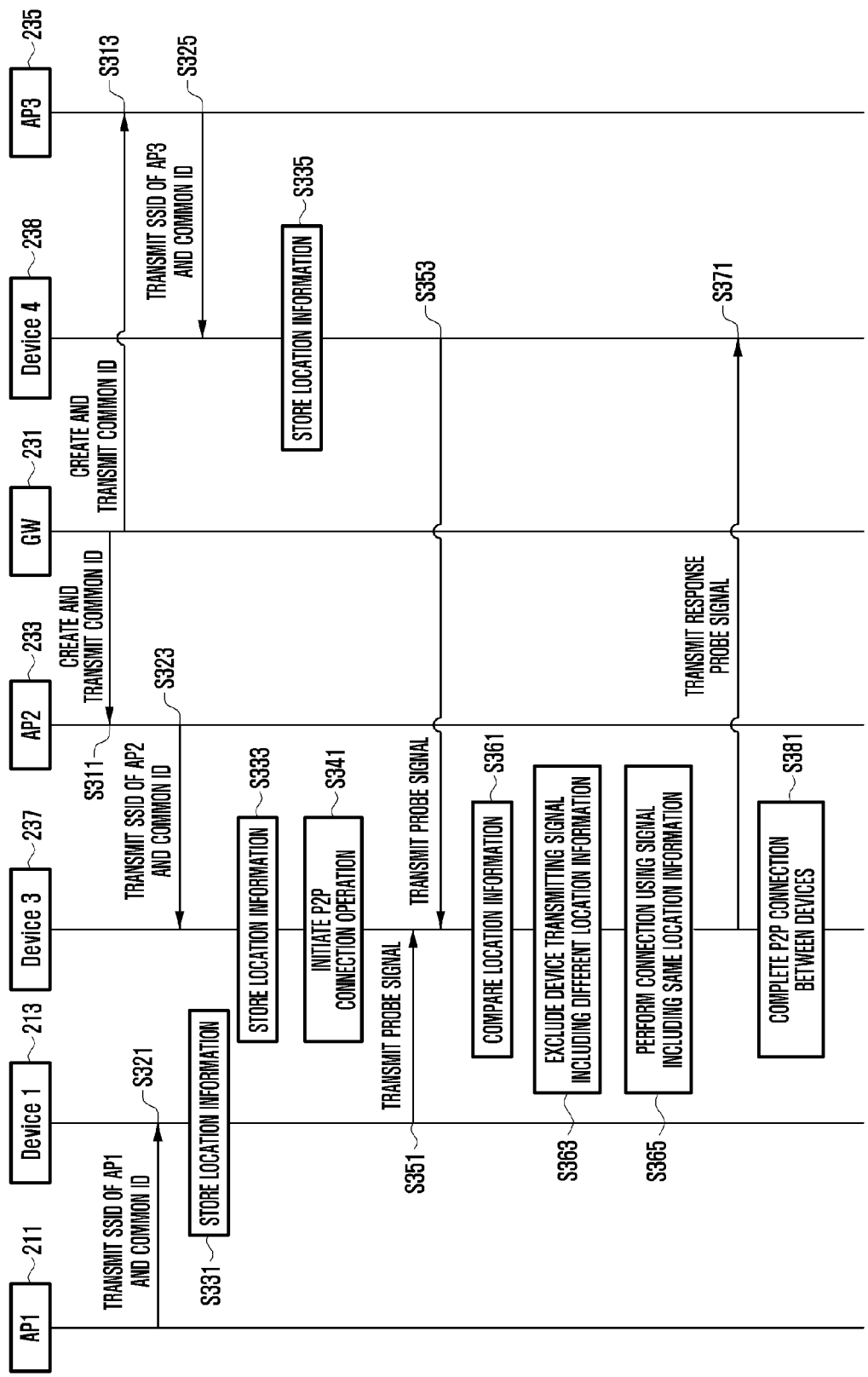
FIG. 3 is a signal flow diagram illustrating signal flow between devices according to an embodiment of the present invention.

FIG. 3 is a signal flow diagram illustrating signal flow between devices according to an embodiment of the present invention.

Signal exchanges and operations between entities in a Wi-Fi Direct connection process based on an embodiment of the present invention is described below with reference to FIG. 3. According to an embodiment of the present invention, when turned on, a Wi-Fi device in each house receives an ID of its AP and registers the information. The device records the ID of the AP in a packet of a probe signal based on the received ID information and transmits/receives the packet. In the case where a plurality of APs is present in a house, the device indicates that the plural APs are located in the same region, by providing common ID information via a gateway. In an attempt to create a P2P connection, one device receives probe signals from other devices and discerns location information thereof based on ID information of APs included in the probe signals. That is, the device may exclude, in device discovery, devices having different location IDs from those of the APs in its house. However, when APs have common ID regions despite different IDs thereof, if a comparison result shows that the IDs coincide with each other, device discovery may be performed for the devices.

Hereinafter, each step is described in more detail with reference to FIG. 3.

Each entity illustrated in FIG. 3 is assumed to correspond to each entity illustrated in FIG. 2 and denoted by the same reference numeral. A gateway 231 connected to the second and third APs 233 and 235 creates a common ID for identifying common location information and transmits the common ID to each of the second and third APs 233 and 235 in steps S311 and S313.

Next, each of first, second, and third APs 211, 233, and 235 creates location information to transmit to a device based on identification information thereof. The identification information may be unique information of the first, second, and third APs 211, 233, and 235. For example, unique information, such as an SSID and IP attributes, may be used. When creating the location information, the first, second, and third APs 211, 233, and 235 having received the common ID information from the gateway (GW) 231 creates the location information based on the identification information thereof and the common ID information. The location information created by the first, second, and third APs 211, 233, and 235 are transmitted to the first, third, and fourth devices 213, 237, and 238, respectively in steps S321, S323, and S325.

The first, third, and fourth devices 213, 237, and 238 receive and store the location information. The location information is stored in a storage unit for comparison with location information which will be received from another device. In addition, the location information may be recorded in a signal transmitted in the Wi-Fi Direct connection process. For example, the location information may be recorded in a probe signal. Each device transmits the probe signal having the location information recorded therein to other devices to perform the Wi-Fi Direct connection process in steps S331, S333, and S335.

The Wi-Fi Direct connection process of the third device 237 is described below with reference to the steps following step S341. The third device 237 is merely an example and the present invention is not limited thereto.

The third device 237 initiates the Wi-Fi Direct connection operation in step S341. The third device 327 receives probe signals from one or more of the first and fourth devices 213 and 238 existing within the Wi-Fi signal range in Steps S351 and S353.

Figure 4:
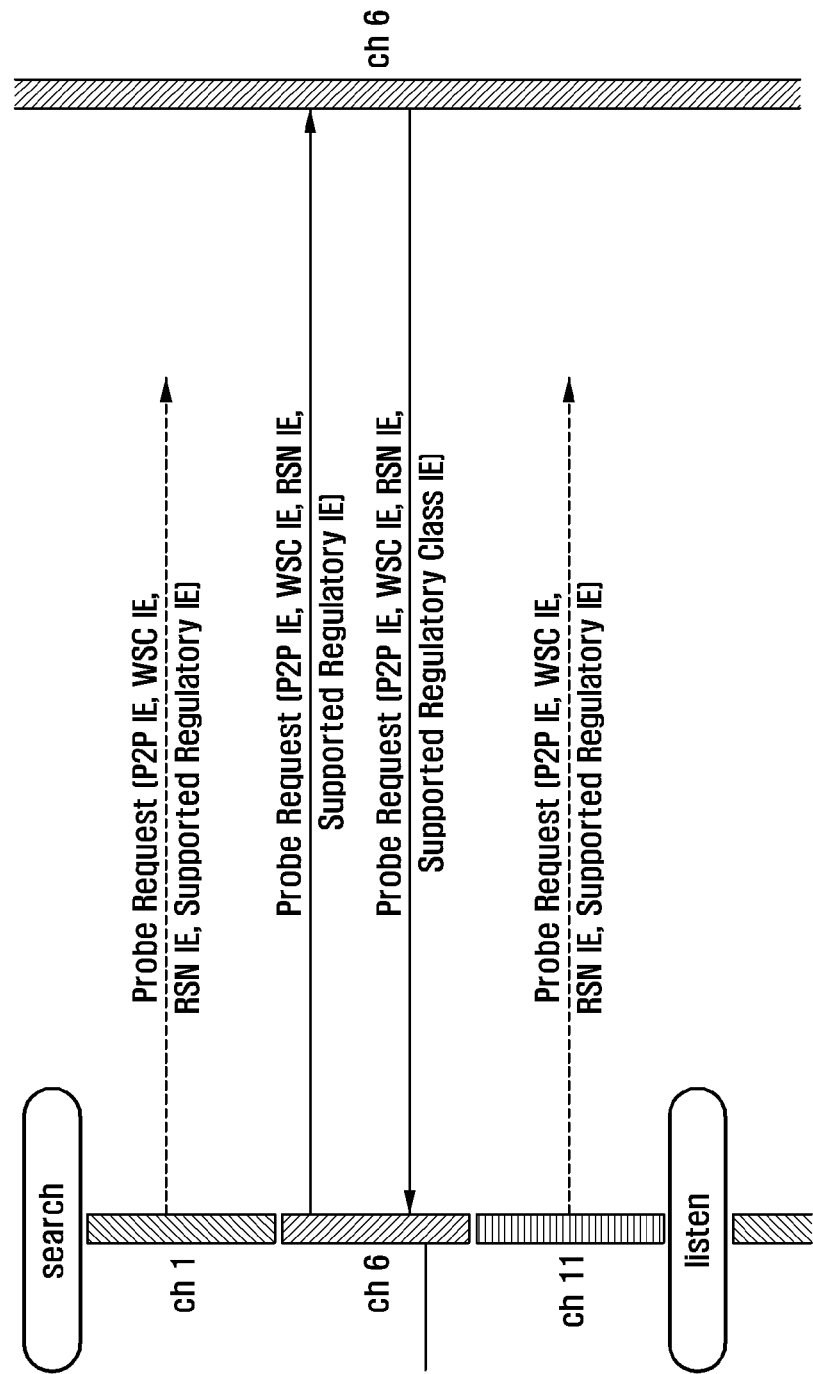
FIG. 4 illustrates a probe request signal and a probe response signal according to an embodiment of the present invention.

For reference, a process of transmitting and receiving a probe request signal and a probe response signal is described below with reference to FIGS. 4 and 5.

Each device may transmit a Wi-Fi probe request signal for the Wi-Fi Direct connection. The probe request signal may include information, such as IE, WSC IE, and Supp Reg IE. A device receiving the Wi-Fi probe request signal may transmit a probe response signal. The probe response signal may include P2P IE, WSC IE, RSN IE, and Supp Reg IE.

Figure 5:
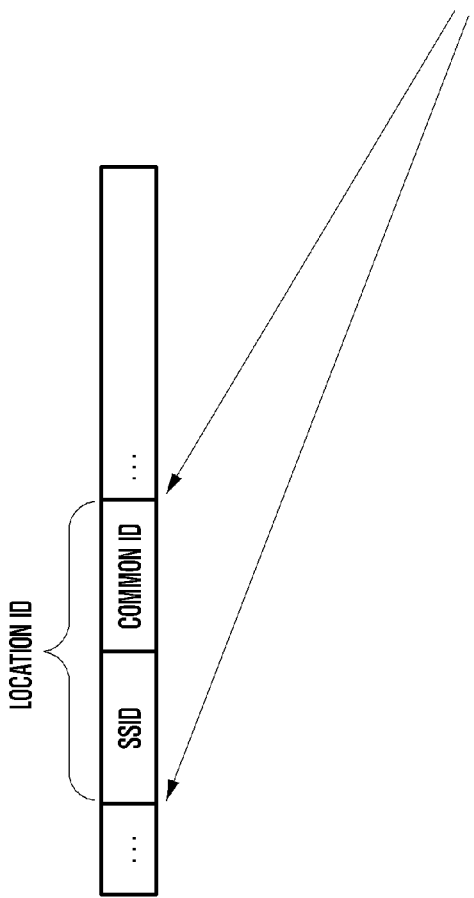
FIG. 5 illustrates a P2P information element according to an embodiment of the present invention.

Referring to FIG. 5, the device for transmitting a probe request signal may transmit probe request signals for a plurality of channels. The device receiving the probe request signals may transmit a probe response signal in response to the probe request signal of the same channel. In this case, the Wi-Fi Direct connection is configured in the same channel so that communication may be performed. In FIG. 4, two devices exchange a probe request signal and a probe response signal in channel 6, and a connection may be configured.

A P2P information element may be configured as illustrated in FIG. 5. The P2P information element may be divided into fields, applications of which have been determined in advance, and reserved fields (e.g. fields 19 to 220 and fields 222 to 255). The reserved fields may be applied to include additional information since applications thereof have not been determined.

In an embodiment of the present invention, a method of comparing location information with that of another device is provided, by including the location information in a reserved field of a P2P IE included in a probe request signal and a probe response signal. The location information included in the reserved field may include unique identification information of an AP to which each device is connected and common information. Information, such as an SSID and an IP address, may be used as the unique identification information. In the case where a plurality of APs is connected to the same gateway, the common information may be used to identify that the plural APs have been connected to the same gateway. The common information may be received from the gateway. The device may create location information based on the SSID and record the created location information in a reserved field. The device may create location information based on the SSID and the common information and record the created location information in the reserved field. Although the location information recorded in the reserved field of P2P IE is exemplified in the above description, the scope of the present invention is not necessarily limited thereto.

Referring to FIG. 3, the third device 237 compares the location information received from the first and fourth devices 213 and 238 with the location information stored therein. The third device 237 extracts location information included in the probe signals received from the first and fourth devices 213 and 238 and compares the extracted location information with the location information stored therein. In other words, the third device 237 identifies the location information recorded in the packets of the probe signals in step S361. According to an embodiment of the present invention illustrated in FIG. 3, the first device 213 and the third device 237 are connected to different APs (e.g., the first AP 211 and the second AP 233), respectively, and therefore have different location information. In addition, the third device 237 and the fourth device 238 are also connected to different APs (e.g., the second AP 233 and the third AP 235), respectively, and therefore have different location information. However, since the APs connected to the third device 3 237 and the fourth device 238 are connected to the same gateway 231, the second and third APs 233 and 235 include the same common information (e.g. common ID). Accordingly, despite the different unique information of the second and third APs 233 and 235, due to the same common information, it may be determined that the location information of the third and fourth devices 237 and 238 is the same. That is, even when the location information of the APs is different, if the common information is the same, it is determined that the devices are located in the same region.

The third device 237 performs a device discovery procedure according to the comparison result on the location information. The first device 213 having transmitted the signal including location information different from the location information thereof may be excluded from the discovery procedure in step S363. In contrast, the discovery and connection procedures continue to be performed for the fourth device 238 having transmitted the signal including the same location information. In the case of the devices illustrated in FIG. 2 but not in FIG. 3, the first and second devices 213 and 215 are excluded in the following discovery and connection procedure due to different location information thereof. The sixth device 236 is connected to the same AP (e.g. the second AP 233) as the third device 237. Therefore, location information is the same, and the discovery and connection procedure continues to be performed. The fourth device 238 and the fifth device 239 are connected to a different AP (e.g. the third AP 235) than the third device 237 (e.g. the second AP 233). However, the fourth and fifth devices 238 and 239 are connected to the same gateway 231 and have the same common information and, thus, it may be determined that the location information is the same.

The third device 237 transmits a probe response signal to the device (e.g. the fourth device 238) which is identified to have the same location information in step S371. In step S381, the third device 237 completes the operation of configuring the P2P connection and then performs Wi-Fi Direct communication with the fourth device 238 connected thereto via Wi-Fi P2P.

Figure 6:
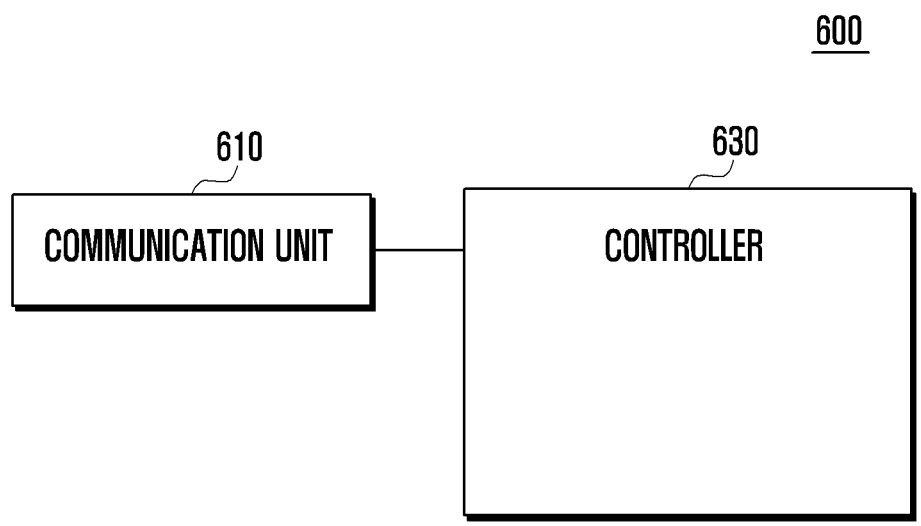
FIG. 6 is a block diagram of an AP according to an embodiment of the present invention.

FIG. 6 is a block diagram of an Access Point (AP) 600 according to an embodiment of the present invention. The AP 600 include a communication unit 610 for performing data communication with network nodes therearound and a controller 630 for controlling the overall operation of the AP 600.

The AP 600 creates location information to transmit to a device based on identification information thereof. The identification information may be unique information of the AP 600. For example, unique information, such as an SSID and IP attributes, may be used. When creating the location information, the AP 600 having received common ID information from a gateway may create the location information based on the identification information thereof and the common ID information. The location information created in the AP 600 may be transmitted to the device.

According to an embodiment of the present invention, the controller 630 receives common location information from at least one gateway and transmits the unique identification information of the AP 600 and the common location information to at least one Wi-Fi Direct support device. The unique identification information and the common location information may be used to create location information, which is included in a probe signal, in the Wi-Fi Direct support device. The unique identification information may include at least one of a Service Set Identifier (SSID) and unique IP information of the wireless AP 600.

For convenience of description, the AP 600 has been described as being configured with the communication unit 610 and the controller 630. However, the scope of the present invention is not limited thereto. It is apparent that the controller 630 can control the operations of the AP 600 described with reference to FIGS. 1 to 5.

The embodiments of the present invention disclosed in the present specification and drawings are provided merely to readily describe and to help a thorough understanding of the present invention but is not intended to limit the scope of the present invention. Therefore, it should be construed that all modifications or modified forms drawn by the technical idea of the present invention in addition to the embodiments disclosed herein are included in the scope and spirit of the present invention, as defined by the appended claims and their equivalents.

What is claimed is:
1. A Wireless Fidelity (Wi-Fi) Direct connection method for a User Equipment (UE), comprising:
receiving a probe signal from at least one device;
comparing location information in the probe signal with location information of the UE; and performing the Wi-Fi Direct connection for the at least one device transmitting the probe signal comprising location information that is the same as that of the UE.

2. The Wi-Fi Direct connection method of claim 1, wherein the location information is created based on a Service Set Identifier (SSID) of an Access Point (AP) to which the UE or the at least one device is connected.

3. The Wi-Fi Direct connection method of claim 2, wherein the location information further comprises common identification (ID) information when a plurality of APs is connected to a gateway (GW).

4. The Wi-Fi Direct connection method of claim 1, wherein performing the Wi-Fi Direct connection comprises:
excluding, in device discovery, the at least one device transmitting the probe signal comprising location information that is different from that of the UE.

5. The Wi-Fi Direct connection method of claim 2, further comprising:
receiving the SSID from the AP;
creating the location information based on the SSID; and
storing the created location information.

6. The Wi-Fi Direct connection method of claim 5, further comprising:
creating a probe signal using the location information.

7. The Wi-Fi Direct connection method of claim 1, wherein the location information is in a Peer to Peer (P2P) information element of the probe signal.

8. A User Equipment (UE) for supporting a Wireless Fidelity (Wi-Fi) Direct connection, comprising:
a communication unit configured to perform data communication with an Access Point (AP) and at least one device; and
a controller configured to receive a probe signal from the at least one device, compare location information in the probe signal with location information of the UE, and perform the Wi-Fi Direct connection for the at least one device transmitting the probe signal comprising location information that is the same as that of the UE.

9. The UE of claim 8, wherein the location information is created based on a Service Set Identifier (SSID) of the Access Point (AP) to which the UE or the at least one device is connected.

10. The UE of claim 9, wherein the location information further comprises common identification (ID) information when a plurality of APs is connected to a gateway (GW).

11. The UE of claim 8, wherein the controller is further configured to exclude, in device discovery, the at least one device transmitting the probe signal comprising location information that is different from that of the UE, when performing the Wi-Fi Direct connection.

12. The UE of claim 9, wherein the controller is further configured to receive the SSID from the AP, create the location information based on the SSID, and store the created location information.

13. The UE of claim 12, wherein the controller is further configured to create a probe signal using the location information.

14. The UE of claim 8, wherein the location information is in a Peer to Peer (P2P) information element of the probe signal.

15. A method of supporting a Wireless Fidelity (Wi-Fi) Direct connection for a wireless Access Point (AP), comprising:
receiving common location information from at least one gateway; and
transmitting unique identification information of the wireless AP and the common location information to at least one Wi-Fi Direct support device,
wherein the unique identification information and the common location information are used to create location information, which is in a probe signal, in the at least one Wi-Fi Direct support device.

16. The method of claim 15, wherein the unique identification information comprises at least one of a Service Set Identifier (SSID) and unique Internet Protocol information of the wireless AP.

17. A wireless Access Point (AP) for supporting a Wireless Fidelity (Wi-Fi) Direct connection, comprising:
a communication unit configured to perform data communication with a network node therearound; and
a controller configured to receive common location information from at least one gateway and transmit unique identification information of the wireless AP and the common location information to at least one Wi-Fi Direct support device,
wherein the unique identification information and the common location information are used to create location information, which is in a probe signal, in the at least one Wi-Fi Direct support device.

18. The wireless Access Point (AP) of claim 17, wherein the unique identification information comprises at least one of a Service Set Identifier (SSID) and unique Internet Protocol information of the wireless AP.

* * * * *